United States Patent [19]

Nilssen

[11] 4,259,618

[45] Mar. 31, 1981

[54] ELECTRONIC ASSEMBLY

[76] Inventor: Ole K. Nilssen, Caesar Dr., Rte. 4, Barrington, Ill. 60010

[21] Appl. No.: 937,452

[22] Filed: Aug. 28, 1978

[51] Int. Cl.³ ............... H05B 37/02; H05B 39/04; H05B 41/36
[52] U.S. Cl. ............... 315/360; 307/140; 315/119; 315/120
[58] Field of Search ............... 315/360, 119, 120; 307/140, 141

[56] References Cited

U.S. PATENT DOCUMENTS

| | | | |
|---|---|---|---|
| 3,491,249 | 1/1970 | Rabinow | 307/141 |
| 3,889,132 | 6/1975 | Vreeland | 307/141 |
| 3,949,241 | 4/1976 | Maute | 315/360 |
| 3,979,601 | 9/1976 | Franklin | 307/141 |
| 4,002,925 | 1/1977 | Monahan | 315/360 |
| 4,058,752 | 11/1977 | Woods et al. | 315/360 |
| 4,104,541 | 8/1978 | Jewell | 315/360 |

Primary Examiner—Saxfield Chatmon, Jr.
Attorney, Agent, or Firm—McCaleb, Lucas & Brugman

[57] ABSTRACT

A compact electronic assembly operable to control the energization of an electrical appliance is adapted for convenient mounting in an existing, standard electrical wall-switch box. A disconnectable electronic control means is mounted on the outside of the switch face plate and communicates with circuitry inside the wall-switch box by means of a plug-in connection through the aperture of the switch face plate. According to one aspect of the invention, a programmable electronic timer-switcher comprises a mounting plate which is secured to the opening of the wall switch box. A multiple-conductor receptacle is secured to the mounting plate, which also preferably serves as a heat sink for a switching means such as a triac. The receptacle is aligned behind the rectangular aperture of a standard switch face plate to permit plug-in connection to a programmable electronic timer disposed exteriorly of the face plate. The switching means and the timer cooperate to effect controlled energization of the electrical light or appliance. According to other aspects of the present invention, appliance timer-switches are adapted for engagement with standard electrical outlets and connection to electrical appliance cords.

11 Claims, 8 Drawing Figures

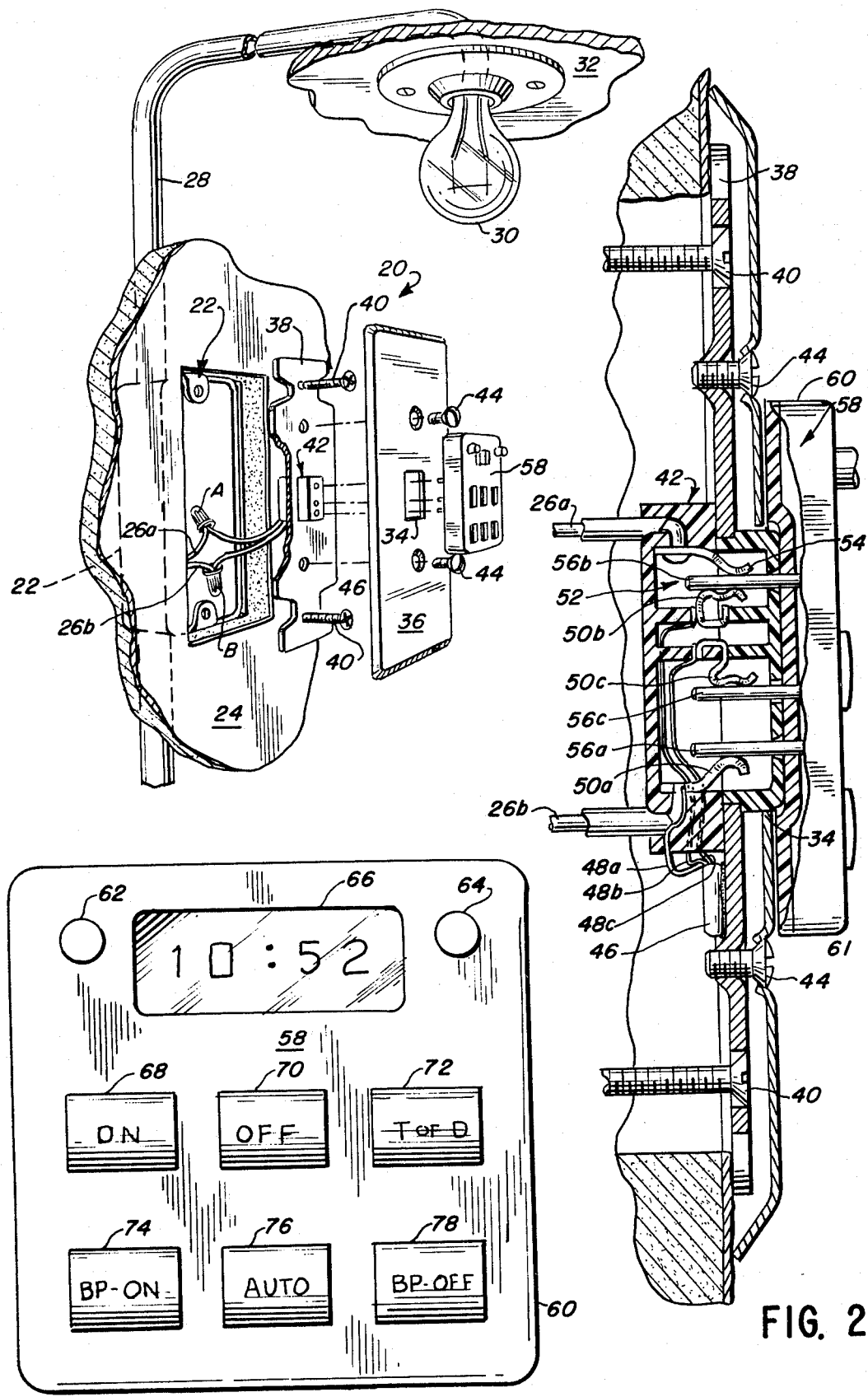

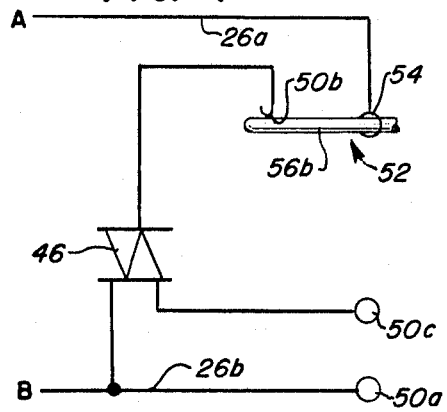
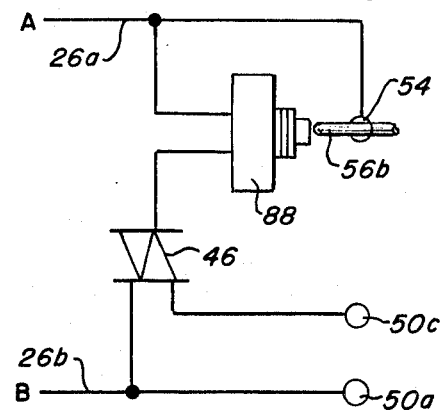
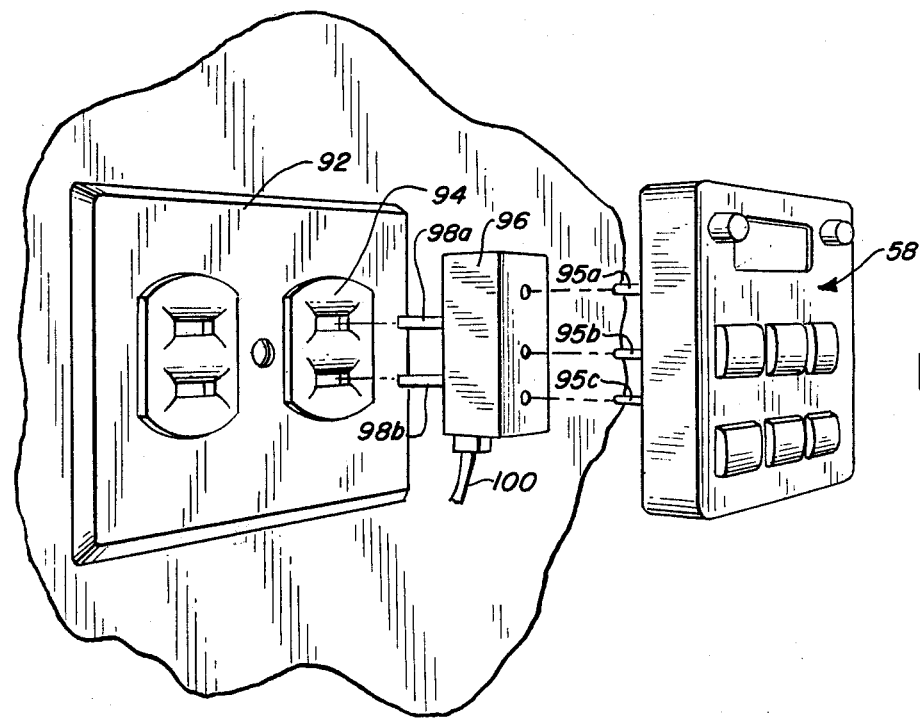
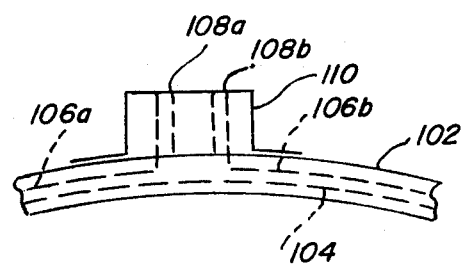
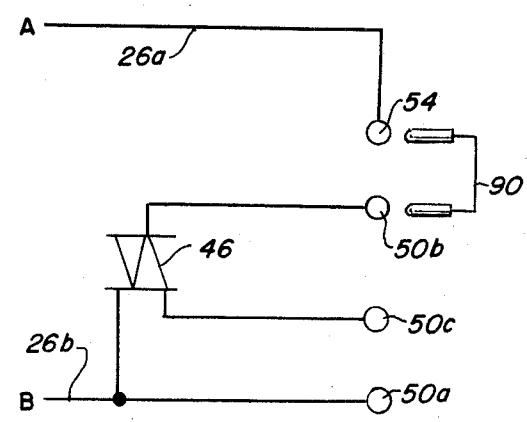

ELECTRONIC ASSEMBLY

BACKGROUND OF THE INVENTION

1. Field of the Invention

This invention relates to electrical and electronic devices suitable for controlling electrical lighting or appliances.

2. Description of Prior Art

Various types of electronic and electrical timing and switching devices have been provided for pre-set control of electrical lights, appliances and machinery in home and industrial applications. For example, a timer-switcher, which is particularly useful for a homeowner, is operable to control the turn-on and turn-off times of indoor lighting to create the impression that a home is occupied when in fact it may not be, in order to discourage would-be burglars or vandals. However, such prior known electronic devices are not readily adaptable for compact and convenient mounting in standard electrical wall-switch boxes. Most currently available timer-switchers are relatively large electro-mechanical devices; the only known wall-switch-mountable electronic timer-switcher cannot be used with standard wall face plates.

SUMMARY OF THE INVENTION

In general, the present invention is a compact electronic appliance control assembly which is adapted for convenient mounting in an existing, standard electrical wall-switch box. A disconnectable, plug-in electronic control means is mounted on the outside of the standard switch face plate and communicates with circuitry inside the wall-switch box by means of a plug and receptacle connection through the aperture of the switch face plate. Thus, there is no need for a special wall face plate.

According to one aspect of the present invention, a compact, low-cost electronic timer-switcher assembly is easily mounted in an existing, conventional wall-switch box for connection to the single switched leg or side of the power line usually present in the box. The timer-switcher utilizes the standard rectangular opening of the existing wall-switch cover or face plate for a plug-in type connector between the internal electrical light or appliance circuit and an external programmable electronic timer. More specifically, this timer-switcher assembly preferably comprises a keyed receptacle secured to a combination mounting plate and heat sink which fits over the opening of the standard wall-switch box. An electronic switching device, such as a triac, is connected to the receptacle and is mounted in thermal contact with the heat sink mounting plate internally of the wall-box. The receptacle is aligned in position with the rectangular aperture in the standard wall-switch cover plate and a disconnectable, plug-in programmable electronic timer module, disposed exteriorly of the face plate, has a multiple-conductor plug insertable through the aperture for engagement with the receptacle. For safety, an interlock disconnect is provided to mechanically disconnect the power from the load when the electronic timer unit is unplugged from the receptacle. The programmable timer module is provided with the usual time of day, turn-on and turn-off controls, as well as a bypass control to override the automatic control function to permit normal switching operation. Since the mounting plate, switching means and keyed receptacle are compact enough to fit within even the smallest standard wall-switch box, the use of a custom wall plate for covering the box is not required.

According to other aspects of the present invention, compact electronic timer-switcher assemblies are readily adapted for plug-in connection to standard electrical wall receptacles and for attachment to electrical appliance supply cords.

It is a primary object of the present invention to provide an electronic appliance control assembly for convenient installation within an existing, standard electrical wall-switch box.

Another object of the present invention is to provide an external, disconnectable electronic control means mounted on the outside of the existing switch face plate for communication with internal appliance circuitry by means of a plug-in connection through the aperture of the face plate, thereby obviating the necessity of providing a special wall plate.

Still another important object of the present invention to provide a low-cost, compact electronic timer-switcher assembly which is conveniently and readily mounted in a conventional wall-switch box for controlling an associated light or other electrical appliance.

A further object of this invention is to provide an electronic timer-switcher having interlock disconnect means for mechanically disconnecting the power from the load when the electronic timer module is unplugged.

It is another object of this invention to provide a universal electronic timer-switcher assembly which has a timer module that can be mounted not only at a wall switch-box but also, with minor modifications and th use of adapters, to an electrical appliance cord or an outlet receptacle.

The means by which the foregoing and other objects of the present invention are accomplished and the manner of their accomplishment will be readily understood from the following specification with reference to the accompanying drawings, which, taken together, disclose preferred embodiments of the present invention.

BRIEF DESCRIPTION OF THE DRAWINGS

FIG. 1 is an exploded perspective view of an electronic assembly according to the present invention illustrated as an electronic timer-switcher mounted in a standard wall-switch box for control of an associated ceiling light;

FIG. 2 is an enlarged side view of the timer module shown in FIG. 1;

FIG. 3 is a front elevation of the plug-in timer module illustrated in FIG. 2;

FIG. 4 is a partial schematic circuit diagram of the timer-switcher assembly showing a triac switching means and a sliding bar type of mechanical disconnect;

FIG. 5 is a similar schematic diagram illustrating a switch type of disconnect;

FIG. 6 is another schematic circuit diagram showing a switch or jumper disconnect;

FIG. 7 is an exploded perspective of an alternate form of the timer-switcher according to the present invention for use with a conventional wall receptacle; and FIG. 8 is a side elevation of an appliance cord adapter for use with a timer-switcher for automatically controlled energization of an appliance.

DESCRIPTION OF THE PREFERRED EMBODIMENTS

With reference to the drawings, FIGS. 1-3 illustrate a preferred embodiment of an electronic assembly according to the present invention comprising a timer-switcher assembly 20 for control of a ceiling light. It is important to note that an electronic assembly of the present invention is not restricted to application to the illustrated timer-switcher; another common example is a light dimmer control. The present invention provides mounting of any compact appliance control electronic device within a wall-switch box wherein the device is manually controlled or set from the outside and the existing wall-switch face plate is utilized.

As shown in FIG. 1, a standard wall-box 22, such as is typically used for common mechanical light switches, is mounted in a wall 24. Electrical wiring comprising one leg of a lighting circuit is shown having leads 26a and 26b, which are wired through a conduit 28 to a light 30 mounted on a ceiling 32. Of course, this timer-switcher may be used to control the energization of various other types of electrical devices.

As will be described in detail, the timer-switcher assembly 20 is shown as comprising two main components, an appliance or light circuit switching means preferably mounted internally of wall-box 22 and a disconnectable, plug-in electronic control or timer means mounted exteriorly thereof and electrically connected with the switching means through a connector disposed within a standard rectangular opening or aperture 34 in an existing, conventional wall-switch cover or face plate 36. With additional reference to FIG. 2, a combination mounting plate and heat sink 38 is secured by means of conventional fasteners 40 to overlie the opening of wall-switch box 22. A keyed receptacle 42 is securely mounted to and positioned on the mounting plate 38 so as to be in alignment with the opening 34 of the cover plate 36 when the latter is mounted to cover the wall-switch box 22 by means of conventional screw fasteners 44 which engage the mounting plate 38. An electronic switching device, in the form of a triac 46 in the preferred embodiment, is securely mounted in thermal contact with, and on the rear of, heat sink 38 and internally of the wall-switch box 22. Triac 46 is wired through leads 48a, 48b and 48c to respective terminals 50a, 50b and 50c within receptacle 42. The mounting plate 38 is appropriately sized so as to provide the requisite heat-sink function for triac 46.

An interlock disconnect, depicted generally by reference numeral 52, is formed within receptacle 42. With additional reference to FIG. 4, the interlock may comprise a simple sliding bar device having a terminal 50b, a terminal 54 (for lead 26a) and a pin 56b extending rearwardly from a programmable electronic timer module 58; terminals 50b and 54 are mechanically and electrically separated when pin 56b is disengaged therewith when the electronic timer module is unplugged. In FIG. 4, which is a partial schematic diagram illustrating the connections of the triac 46 to the lighting circuit comprising leads 26a and 26b, the reference letters A and B identify the connections within the wall-switch box 22 in FIG. 1. The interlock disconnect 52 is provided to both mechanically and electrically disconnect the load when the timer module is unplugged; the interlock disconnect physically breaks the load connections for safety reasons upon timer module removal.

The timer-module 58, which is best seen in FIG. 2, comprises a housing 60 from the rear of which extend terminal plug pins 56a, 56b and 56c. These terminal pins are connected to a programmable electronic timer circuit assembly having a built-in clock feature, the details of which form no part of the present invention. Where the switching device or triac 46 is operable to interrupt only one side or leg of the power line to the light 30, the timer module 58 is conveniently powered from a battery 61 located at the rate of module 58. For safety reasons, the battery 61 is accessible only from the rear of module 58 when the latter is unplugged; when this occurs, the interlock 52 serves to mechanically disconnect the load from the power source.

It should also be recognized that the triac 46 may be contained within the housing 60 of the module 58; of course, this arrangement (not shown) will limit the switching capability of the triac 46 because of reduced heat dissipation capability of the module 58.

Appropriate controls for programming the timer circuit module 58 are mounted on the front of housing 60 and include an hour roll key 62, a minute roll key 64, a four-digit hour and minute read-out display 66, a time-to-turn-on key 68, a time-to-turn-off key 70, a time-of-day key 72, an on bypass key 74, an automatic timing mode key 76 and an off bypass key 78. It is to be understood that the various pushbutton keys noted above can be electrically insulated within housing 60 from the various power line connections through use of well known plastic sheeting of other insulating materials.

The terminal pins 56a, 56b and 56c extending rearwardly from the plug-in timer 58 are keyed, with pin 56c being closer to pin 56a than to 56b, in order to insure proper electrical connections between these pins and their corresponding contacts in the receptacle 42.

FIGS. 5 and 6 schematically illustrate alternate forms of interlock disconnects. FIG. 5 shows a normally open push-switch 88 mounted internally of receptacle 42, the actuating arm of switch 88 being operationally engaged by pin 56b. In the FIG. 6 arrangement, a mechanical jumper or switch, schematically illustrated at 90, is formed in the module 58; when module 58 is unplugged, a jumper 90 secured to module 58 automatically disconnects the triac 46 in a manner similar to that previously described.

FIG. 7 illustrates a programmable timer-switcher according to another aspect of the present invention adapted for plug-in connection to a conventional outlet receptacle 92 having a socket 94. The plug-in programmable electronic module 58, which is preferably identical in construction to that previously described, comprises keyed pins 95a, 95b and 95c which engage corresponding sockets of an adapter 96 having rearwardly extending pins 98a and 98b which, in turn, plug into the outlet socket 94. The adapter 96 comprises a triac switching means similar to that previously described. The appliance to be controlled is connected to adapter 96 through a line cord 100 plugged into the adapter.

Alternatively, the triac 46 may be contained within the interior of the timer module 59. In this arrangement, the appliance to be controlled is connected to the module 58 instead of to the adapter 96 and the module 58 is adapted to plug directly into the wall receptacle.

FIG. 8 illustrates yet another form of the present invention adapted for connection to an appliance line cord 102 comprising a lead 104 and a broken lead having sections 106a and 106b which are, in turn, connected to receptacle sockets or conductors 108a, 108b, respectively, of a cord adapter 110. In this arrangement, sockets 108a and 108b are designed to receive corresponding pins of a two-prong plug of a programmable electronic timer module (not shown) similar to the timer module 58 previously described, with the exception that the two-prong module comprises an internal triac for switching the leads 106a and 106b of the line cord 102. Alternatively, as will be readily apparent to those skilled in the art, the triac may be contained within the adapter 110, in which case a third receptacle socket or conductor, similar to 108a and 108b, will be required to permit plug-in connection to a three pin programmable electronic module identical to that disclosed in FIG. 7. The cord adapter preferably contains a shorting feature comprising a spring connector (not shown) between the receptacle sockets or conductors 108a and 108b for shorting them together upon removal of the timer means module from the adapter 110.

With regard to the overall operation of the various timer-switcher assemblies of the present invention, through proper programming of the various controls on a module 58, an appropriate appliance energization time-control program can be pre-set. For example, with the control arrangement of the module 58 illustrated in FIG. 3, to set a "turn-on" time, it is only necessary to press the time-to-turn-on key 68 while at the same time operating one of the time-roll keys 62, 64. Thus, by pressing the time-to-turn-on key 68 whith the hour-roll key 62, one can set the hour of the turn-on time; by pressing the time-to-turn-on key 68 with the minute-roll key 64, one can set the minute of the turn-on time. To program the time-to-turn-off or time-of-day timer, a similar procedure is followed with keys 70, 72, respectively. After the desired programming has been performed, the automatic timing mode of module 58 is initiated by pressing the automatic timing mode key 76. If, for some reason, it is desirable to override the automatic operation, it is only necessary to press either the on bypass key 72 or the off bypass key 78. Any time thereafter, if the automatic timing mode key 76 is pressed, the timer module 58 will revert to its automatic mode and resume its automatic switching cycle. Otherwise, the timer module 58 can be used as a simple on-off switch via keys 74, 78.

It is thought that the invention and many of its attendant advantages will be understood from the foregoing description, and it is apparent that various changes may be made in the form, construction and arrangement of its component parts without departing from the spirit and scope of the invention or sacrificing all of its material advantages, the form described being merely a preferred embodiment thereof.

The embodiments of the invention in which an exclusive property or privilege is claimed are defined as follows:

1. An electronic assembly operable to control the switching of a single leg of an electrical load circuit connected to a power source and adapted for mounting at a standard electrical wall-switch box having a face plate with a single central aperture therein, said assembly comprising:
   electrically actuatable load circuit switching means disposed within the wall-switch box,
   a multiple-conductor receptacle being connected to the load switching means and mounted in alignment with the aperture of the face plate and
   a plug-in programming means adapted for placement exteriorly of the face plate and having a multiple-conductor plug insertable through the aperture to engage the receptacle;
   whereby said programming means operates said circuit switching means for controlled energization of the electrical load.

2. The electronic assembly of claim 1 and disconnect means for mechanically and electrically disconnecting the load from the power source upon removal of said plug from said receptacle.

3. A programmable electronic timer-switcher operable to control the switching of a single leg of an electrical load circuit connected to a power source and adapted for mounting at a standard electrical wall-switch box having a face plate with a single central aperture therein, said timer-switcher comprising:
   semiconductor load switching means located within the wall-switch box,
   a multiple-conductor receptacle being connected to the switching means and mounted in alignment with the aperture of the face plate and
   a plug-in programmable electronic timer means adapted for placement exteriorly of the face plate and having a multiple-conductor plug insertable through the aperture to engage with the receptacle;
   whereby said switching means is controlled by said electronic timer means to effect energization and de-energization of the electrical load in accordance with a preset program.

4. The timer-switcher of claim 3 and a mounting plate comprising a heat sink and being secured to the opening of the wall-switch box, and wherein said switching means is mounted on said mounting plate in thermal contact therewith.

5. The timer-switcher of claim 3 wherein the switching means and the timer means are powered from the single leg of the eletrical load circuit.

6. The timer-switcher of claim 4 and disconnect means for mechanically and electrically disconnecting the load from the power source upon removal of said plug of said timer means from said receptacle.

7. The timer-switcher of claim 3 wherein said timer means comprises a battery for energization thereof.

8. The timer-switcher of claim 6 wherein said battery is located at the rear of said timer means to be accessible only when said timer means is unplugged from said receptacle.

9. A programmable electronic timer-switcher operable to control the switching of a single leg of an electrical load circuit and adapted for plug-in connection to a standard electrical outlet receptacle, said timer-switcher comprising:
   programmable electrical timer means having a plug;
   plug-in adapter means having a plug insertable into the outlet receptacle and a receptacle for receiving said plug of said timer means; and
   switching means in circuit with the timer means and the load;
   whereby said switching means is controlled by said electronic timer means to effect energization and de-energization of the electrical load in accordance with a preset program.

10. A programmable electronic timer-switcher operable to control the switching of a single leg of an electrical load circuit in an electrical supply cord, said timer-switcher comprising:
   programmable electronic timer means having a multiple-conductor plug;

cord adapter means having a multiple-conductor receptacle for said plug and being in circuit with the load supply cord; and switching means in circuit with the timer means and the load;

whereby said switching means is controlled by said electronic timer means to effect energization and de-energization of the electrical load in accordance with a preset program.

11. The timer-switcher of claim 10 wherein said adapter means comprises a two-conductor receptacle in circuit with one wire of the load cord and shorting means for electrically connecting the receptacle conductors together upon removal of said timer means plug from said receptacle.

* * * * *

UNITED STATES PATENT OFFICE
CERTIFICATE OF CORRECTION

PATENT NO. : 4,259,618
DATED : March 31, 1981
INVENTOR(S) : Ole K. Nilssen

It is certified that error appears in the above-identified patent and that said Letters Patent are hereby corrected as shown below:

Column 2; line 34 - "th" should be -- the --

Column 4; line 60 - "59" should be -- 58 --

Column 5; line 28 - "whith" should be -- with --

Column 6; line 53 - "electrical" should be -- electronic --

Signed and Sealed this

Fourth Day of August 1981

[SEAL]

Attest:

GERALD J. MOSSINGHOFF

Attesting Officer

Commissioner of Patents and Trademarks